United States Patent [19]

Cotten, Jr.

[11] 3,801,748

[45] Apr. 2, 1974

[54] HIGH SPEED SIGNAL MULTIPLEXER

[75] Inventor: Whitworth W. Cotten, Jr., Melbourne, Fla.

[73] Assignee: Harris-Intertype Corporation, Cleveland, Ohio

[22] Filed: Sept. 20, 1972

[21] Appl. No.: 290,711

[52] U.S. Cl. .................................. 179/15 A, 332/11

[51] Int. Cl. .................................. H04j 3/04

[58] Field of Search ......... 179/15 A, 15 BL, 15 AN; 332/11

[56] References Cited

UNITED STATES PATENTS

| | | | |
|---|---|---|---|
| 3,018,449 | 1/1962 | Farrelly | 179/15 A |
| 3,158,692 | 11/1964 | Gerkensmeier | 179/15 A |
| 3,503,013 | 3/1970 | Warren | 332/11 |

*Primary Examiner*—Ralph D. Blakeslee

[57] ABSTRACT

An analog signal multiplexer uses constant-current devices to multiplex accurately at a high sampling rate. The multiplexer sequentially connects signals from a plurality of input channels to an output bus. Each input signal is passed through an amplifier and then connected through a diode switching circuit to the output bus. Each diode switching circuit comprises two diodes opposingly connected in series, with their junction also connected to a constant-current sink which can be turned on and off by a command pulse. A constant-current source, used in succession by all of the input channels, continuously provides current directly to the common output bus, of an amount one-half as great as is drawn by each constant-current sink. A channel is selected by turning on its current sink, whereupon both diodes of the selected channel conduct and the voltage at the selected amplifier is reproduced at the output bus. Each amplifier supplies current to a constant-current sink substitute load when the channel is not selected.

9 Claims, 3 Drawing Figures

HIGH SPEED SIGNAL MULTIPLEXER

BACKGROUND OF THE INVENTION

Several time-varying signals can be transmitted over a single communication channel by sampling each of the signals in rapid succession and applying the samples sequentially to the single output channel. In this way, the input signals time-share the available output channel, each input signal taking a turn in succession to transmit its information. A multiplexer which is to be used for switching each of the signals in turn to the single output is preferably capable of switching very rapidly from one input signal to another so that the sampling rate is high compared with the rates at which the signals being sampled are expected to vary. Ideally, the multiplexer would behave as a perfect electrical selector switch which changes from one channel to another with no switching transients and which transmits the selected input signal to the common output terminal without altering the signal by impedance effects in the switch itself.

Multiplexing circuits have been made in the prior art by using a separate diode switch connected between each source of input signal and a common output bus, wherein the switch for only one input channel is turned on at a given time. For example, in one type, each diode switch is a series circuit of two diodes connected in opposing directions of current flow with a control circuit connected at the junction point of the two diodes. The control circuit is operated by switching of voltages applied to it. When a particular input channel is not selected, voltages in its control circuit are switched so as to block signals at at least one of the diodes by back-biasing it. See U.S. Pat. No. 3,098,214.

In that type of multiplexer, if the voltage drops through the diodes of a selected channel are not equal, the output voltage is not a faithful reproduction of the selected input voltage. Unequal diode voltage drops may exist even if the diodes are matched to have equal voltage drops for equal values of current, because with diode switching circuits of the prior art the currents in the diodes may not be equal under all conditions. A voltage-type of control circuit connected to the junction of the two diodes has impedance and voltage characteristics such that the currents flowing through the diodes cannot be accurately controlled, especially when the input voltage varies widely.

Another problem of the prior multiplexing art is that switching of the control circuits for selecting the input channels has been slow, as viewed on a nanosecond time scale, with the result that switching has limited the sampling rate. Moreover, after switching has been accomplished in some multiplexers of the prior art, the output signal does not immediately copy the selected input voltage because of transient components of signal which are superimposed by the multiplexer itself upon the steady-state value.

SUMMARY OF THE INVENTION

One object of the present invention is to provide a signal multiplexer whose output voltage is a faithful reproduction of each of a plurality of sequentially selected input voltages.

Another object is to provide a multiplexer capable of fast switching so as to permit a high sampling rate.

Another object is to provide a multiplexer of a type which permits accurate substitute loading of idle circuits, thereby reducing the settling time and increasing the achievable sampling rate.

The present invention accomplishes the preceding objects and others by connecting each available input voltage to a common output bus through two opposably connected rectifying means. An input voltage is selected for connection to the output bus by turning on a constant-current sink which is connected between the two rectifying means in the selected input channel. A constant-current source always provides current to the output bus, the current being selectively diverted to whichever channel is selected. Each input channel provides current to the constant-current sink through one of the two rectifying means when the channel is selected, and in the preferred form, to a substitute load otherwise.

DESCRIPTION OF THE PREFERRED EMBODIMENT

A preferred embodiment of the present invention uses series oppositely-connected diodes as a diode switch, employs a switchable constant-current sink as the control circuit connected at the junction of the diodes in each input channel, and has a constant-current source connected to the common output bus to provide part of the current to the selected constant-current sink. The other part of the current required by the constant-current sink of the selected channel is drawn from an operational amplifier in the selected channel. To select a channel, control signals turn on one of the constant current sinks and turn off all of the others.

The constant-current sinks and the constant-current source have gain and are internally regulated to control the current by feedback, so that their equivalent internal impedances are extremely high compared with other impedances in the multiplexer. The current of each constant-current sink is twice the current of the constant-current source, which is used in common by all of the channels. Consequently, in the selected input channel, the current through the output diode is half the current in the constant-current sink so that the current through the input diode must also be half of the current in the constant-current sink; the currents in the two diodes are therefore equal. The internal impedance of the input signal source feeding the diode switch of each channel is made very low by providing each input channel with an operational amplifier having negative feedback. Each input signal source is therefore capable of providing the current which is required for the input diode with negligible effect upon the voltage of the input signal source.

Figure 1:
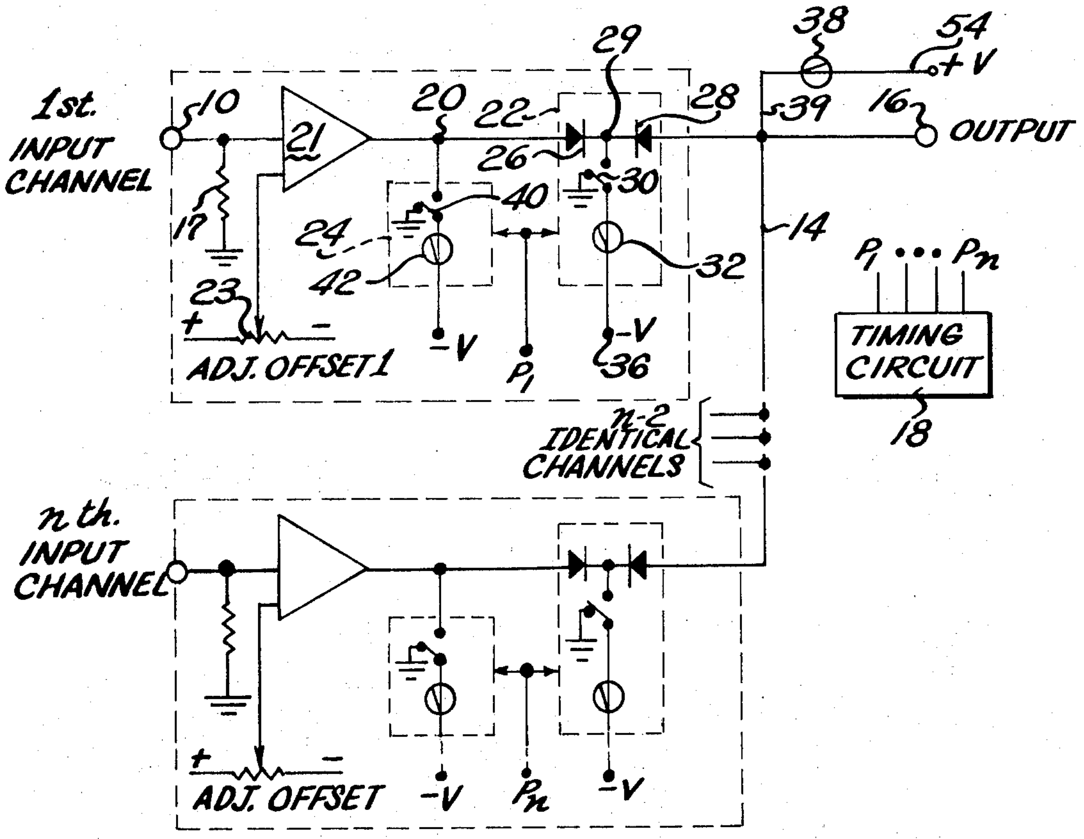
FIG. 1 is a partly schematic diagram and partly block diagram of a preferred embodiment of the multiplexer.

A preferred embodiment of the invention having n inputs and one output is shown in FIG. 1. Input signals are respectively applied to a corresponding one of a plurality of input terminals comprising a terminal 10 for a first input channel, a terminal 12 for an $n^{th}$ input channel, and other terminals for $n-2$ other identical input channels, which are omitted from FIG. 1 for clarity. The output of each input channel is connected to an output bus 14 which has an output terminal 16 at which a pulse-amplitude-modulated pulse train signal appears when the multiplexer is operated. The signal at terminal 16 is a replica of the signal at terminal 10 for a time, then is a replica of the signal on each other input channel in succession through input channel number $n$, after which the cycle repeats continually. A timing circuit 18 provides timing pulses $P_1$ through $P_n$ to connect the $n$ input channels to the output bus 14 in a timed sequence.

Referring to the first input channel, an input signal is applied to a shunt resistor 17 which is connected to one input of a differential amplifier 21 which has negative feedback. Another differential input terminal 19 of amplifier 21 is connected to an adjustable source of voltage 23 by which an output voltage at a terminal 20 of feedback amplifier 21 can be offset. The output voltage at terminal 20 continuously tracks the input signal at terminal 10. Amplifier 21 has very low internal output impedance because of its feedback. The output of amplifier 21 is connected to a diode switch 22 and to a substitute load 24. During each time interval in which the first input channel has been selected to transfer its signal to the output bus 14, conventional current flows from the output terminal 20 of amplifier 21 into the diode switch 22. When the first input channel has not been selected, current from the amplifier 21 flows instead to the substitute load circuit 24.

The diode switch 22 comprises an input diode 26, an output diode 28, whose cathode is connected at a junction 29 to the cathode of the input diode 26, a transistor switch 30, and a constant-current sink 32. The diodes 26, 28 are preferably Schottky diodes. When channel 1 is selected, the switch 30, which is under the control of the signal $P_1$ from the timing circuit 18, connects the constant-current sink 32 to the junction 29. A current $2I_s$ flows from the terminal 29 through the transistor switch 30, and through the constant-current sink 32 to a terminal 36 which is connected to a negative voltage supply.

The current drawn by the constant-current sink 32 comes from two sources. A constant-current source 38 has its output terminal 39 connected to the output bus 14 and source 38 supplies a current $I_s$ which is half of the current drawn by current sink 32. When input channel 1 is selected all other channels are off, and all of the current $I_s$ from the constant-current source 38 flows through the output diode 28 to the junction 29. The other half of the current drawn by the constant-current sink 32 comes through the input diode 26 from the amplifier 21. The amplifier 21 therefore supplies a current $I_s$ to the constant-current sink 32 via the diode 26 when the first input channel is selected.

The current $I_s$ flowing through the input diode 26 creates a forward voltage drop in diode 26 so that the voltage with respect to ground at the junction 29 between the two diodes is slightly less than the voltage with respect to ground at terminal 20, which is the output of amplifier 21. The current $I_s$ from the current source 38 flowing in the output diode 28 creates a voltage drop in diode 28 having a polarity such that the voltage with respect to ground of the bus 14 is slightly higher than that of the junction 29. The switching diodes 26 and 28 have nearly identical forward impedance characteristics so that when their currents are equal their voltage drops are substantially equal. Consequently, the voltage at the output bus 14 is almost identical to the voltage at the terminal 20 when the first input channel has been selected.

When the command signal $P_1$ is zero an input channel other than input channel number 1 has been selected to transfer its signal to the output bus 14, and the transistor switch 30 disconnects terminal 29 from the constant-current sink 32. The diode switch 22 is thereby effectively opened, because if the voltage on the output bus 14 is then more positive than the voltage at the amplifier terminal 20, the input diode 26 is back-biased, and if instead the voltage at the output bus 14 is less positive than the voltage at the terminal 20, the output diode 28 is back-biased. Back-biasing of either of the diodes 26, 28, prevents the voltage at the terminal 20 from being communicated to the output bus 14.

The current drawn from an operational amplifier when selected is always the same irrespective of the signal voltage in the selected channel, making it possible to provide each channel with a substitute load which draws the same amount of current from the amplifier when the channel is not selected as is drawn when it is selected. Each substitute load is turned off when its channel is selected and turned on otherwise. The substitute load reduces transient changes in the output voltage of a channel upon selection because the channel's amplifier provides the same current before selection as after. The inductance, capacitance and thermal lag elements are precharged to steady-state energy levels.

Accordingly, when an input channel other than the first channel has been selected, the substitute load 40 draws a current $I_s$, so that the amplifier 21 always provides the same current $I_s$ whether the first input channel is selected or not. The inductive, capacitive, and thermal lag elements of the amplifier 21 are therefore not subjected to any significant transients at the time of transition between selection and non-selection, and the amplifier 21 is thereby prevented from drifting to achieve a steady state level after switching. The output current $I_s$ from the amplifier 21 flows through a switch 40 which is part of the substitute load 24 and through a constant-current sink 42 which is also part of the substitute load 24.

Matched pairs of diodes are selected for each diode switch 22. Any remaining imbalance in diodes 26, 28 can be largely compensated by adjusting the voltage offset with adjustment 23 of each operational amplifier, to control the current in the input diode 26.

When the first input channel is not selected some other channel is selected so that the constant-current source 38 provides its current to an input channel at all times. Consequently, the current source 38 does not undergo stabilization transients such as would occur if it experienced changes in its output loading. Its only load changes are those due to imperfections in synchronization in the opening and closing of switches such as switch 30, and are of short duration. The other input channels operate in the same manner as the first channel.

Figure 2:
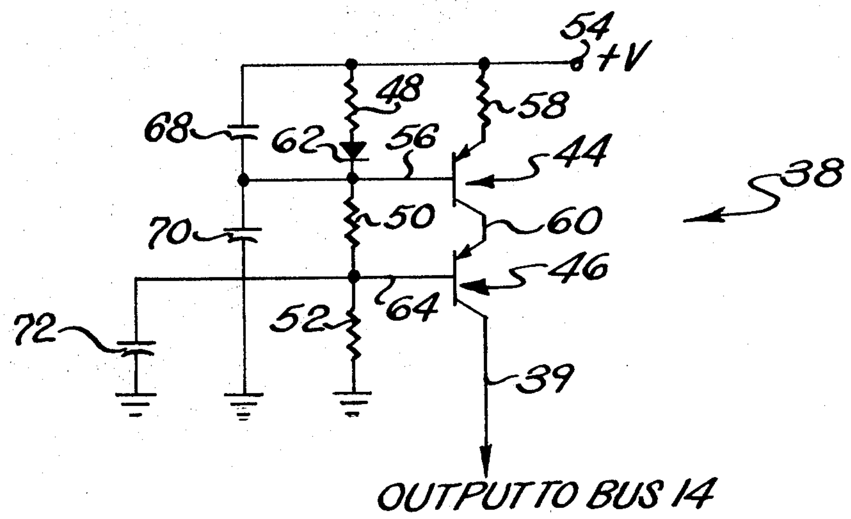
FIG. 2 is a schematic diagram of the constant-current source.

The constant-current source 38 is shown in more detail in FIG. 2. It comprises a constant-current generator of which a transistor 44 is a part, and a buffer or isolation stage of which a transistor 46 is a part. A resistive voltage divider comprising resistors 48, 50 and 52 in series is connected from a terminal 54 to ground, terminal 54 having a constant positive voltage obtained from a power supply. The resistive voltage divider is connected to apply a voltage at a base terminal 56 of the transistor 44 which controls the flow of current through a resistor 58 in the emitter circuit of the transistor 44. The current through the resistor 58 adjusts itself automatically to a value such that a voltage at an emitter of the transistor 44 is greater than the voltage at the base 56 by only a forward drop of the emitter-to-base diode portion of the transistor 44. If the current in resistor 58 should tend to increase, the voltage at the emitter of transistor 44 would decrease so that it would approach the potential of the base 56. Such a change would tend to greatly decrease the current in a collector 60 of the transistor 44, all of which comes through the transistor 44 from the resistor 58. The initial tendency of the current in the resistor 58 to increase would therefore be suppressed by an amplifying action of the transistor 44 so that the transistor 44 serves as a constant-current source, as is known in the prior art. A diode 62 is connected in series with the resistor 48 to produce a forward voltage drop similar to the forward voltage drop of the emitter-to-base diode of the transistor 44 so that the voltage variations across the emitter-to-base diode due to temperature are compensated by similar variations across diode 62, and have a negligible effect upon the current at the collector 60 of the transistor 44.

The PNP transistor 46 is part of a buffer amplifier connected in a common-base configuration. Its base 64 is maintained at a constant potential by a connection to a junction of the resistors 50, 52 of the voltage divider. The input electrode of the transistor 46 is therefore its emitter, which is connected to the collector 60 of the transistor 44. The output terminal of the buffer amplifier is the collector 39 of the transistor 46. The collector 39 is connected to the output bus 14 of the multiplexer. Some small capacitors 68, 70 and 72 are provided for base circuit decoupling of the transistors 44 and 46. Variations in voltage of the output bus 14 appear between the collector 39 and the base 64 of the buffer transistor 46 and have very little effect on the collector 60 of the transistor 44. Thus, the collector 60 is protected from fluctuations in voltage which otherwise might influence the amount of collector current flowing in the transistors 44 and 46.

Figure 3:
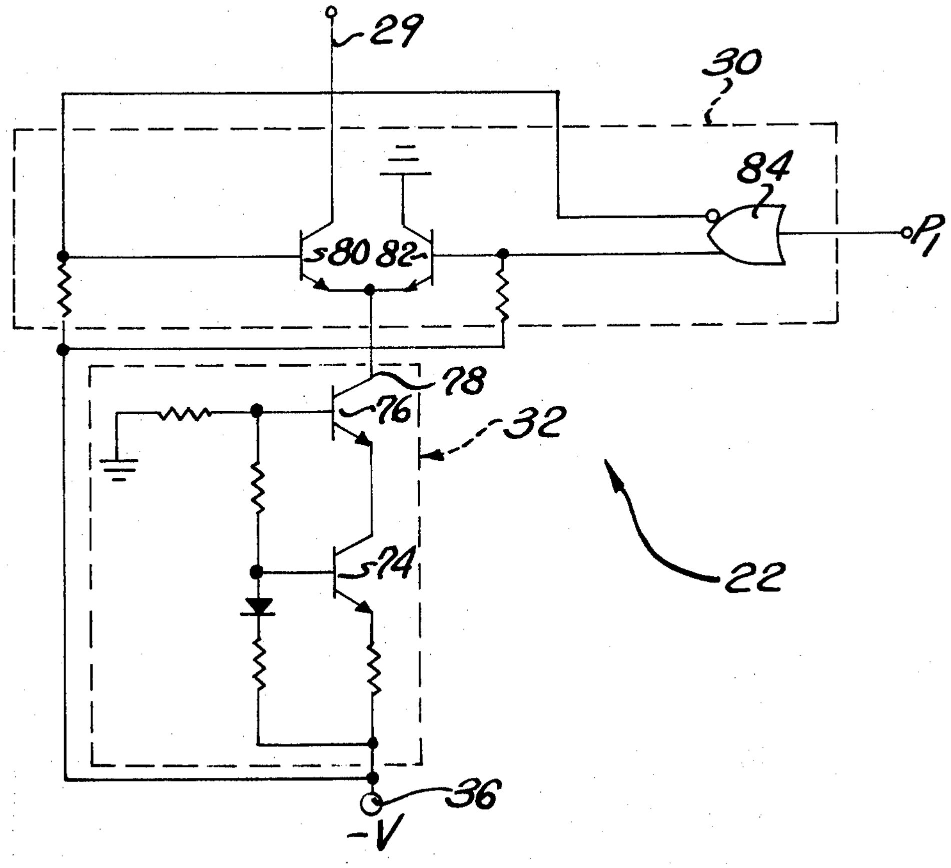
FIG. 3 is a schematic diagram of a constant-current sink and a transistor switch which is preferred for switching the diodes of the multiplexer.

Details of the switch 30 and the constant-current sink 32, which are parts of the diode switch 22, are shown in FIG. 3. The current sink 32 is almost identical to the current source 38 and will not be described in much detail. It comprises a transistor 74 which is for generating constant current and a transistor 76 which is a buffer amplifier for protecting the collector of transistor 74 from voltage variations occurring at the junction 34 of the Schottky diodes 26, 28. The operation of this portion of the circuit is the same as the operation of transistors 44 and 46 except that NPN transistors instead of PNP transistors are employed and the constant-current terminal is a collector 78 of transistor 76.

A transistor type of selector switch connects each constant-current sink either to the switching diodes or to a standby source of current so that the sink draws the same current whether it is selected or not. As a result, the constant-current sinks have a minimum of settling transients upon selection.

Accordingly, the selector switch 30 comprises two transistors 80 and 82 which are turned on and off by a switch driver logic gate 84 having complementary outputs connected to the bases of the transistors 80, 82. Emitters of the transistors 80 and 82 are connected together and to the collector 78 of the transistor 76 so that either the transistor 80 or the transistor 82 can provide a current required by the constant-current sink 32. When a particular input channel is selected to transmit its voltage to the output bus 14, its transistor 80 is switched to conduction by its switch driver 84. When the channel is not selected, its transistor 80 is turned off and instead the transistor 82 is switched to conduction by the switch driver 84, so that when one of the transistors 80, 82 is on, the other one is off. In this way the constant-current sink 32 is maintained free of long transients. A collector of the transistor 82 is connected to ground to provide a source of principal current for the switching transistor 82. A collector of the switching transistor 80 is connected to the terminal 29 which is the junction between the Schottky diodes 26, 28. The control signal $P_1$ enters the switch driver 84 from the timing circuit 18 to control whether or not current for the constant-current sink 32 is drawn from the junction 29 or from ground.

The substitute load circuit 24 for the amplifier 21 comprises the switch 40 and the current sink 42 which are identical to the switch 30 and the current sink 32 respectively except that the resistor values therein are different so that the substitute load circuit 24 draws a current of only $I_s$ and that the base connections of switching transistors of a switch corresponding to the switch 40 are interchanged with respect to the driver logic gate 84. The substitute load current sink 24 obtains its current from the amplifier 21 when the diode switch 22 is blocking, and obtains its current from ground otherwise, under the control of the timing pulse $P_1$.

Although the preferred embodiment of the invention has been described in terms of multiplexing of analog signals, it is clear that it is equally applicable to digital circuits in which the signals can assume two or more states.

Numerous variations of the circuit are possible without departing from the inventive concept. For example, the Schottky diodes 26, 28 of the preferred embodiment may be replaceable by rectifying means of other types, including types which have more electrodes. The constant-current source 38 can be replaced by a constant-current sink if the constant-current sinks of the preferred embodiment are replaced by constant-current sources and the polarities of the diodes 26, 28 are reversed. More generically, the term "source" can apply to current generators of either direction of current flow. Of course, complementary voltages can be substituted everywhere for the polarities shown in the preferred embodiment. Operational amplifiers need not be employed for tracking the input signals if input signals of suitable characteristics are provided by other methods.

It is not essential that the constant-current sink produce a current twice as great as the current of source 38, which would result in equal currents in the diodes 26, 28. The diode currents can be unequal and the diodes can have unequal impedances such that the voltage drop in diode 26 still equals the voltage drop in diode 28, and the multiplexer reproduces the input voltages faithfully at its output. The current source 38 can still be used in common by all of the input channels with this arrangement.

When only one input channel instead of a plurality is used, the invention serves as a switch for connecting and disconnecting the input channel to the output bus.

What is claimed is:

1. A multiplexer for selectively connecting one of a plurality of available signals to an output of the multiplexer in accordance with selection signals, comprising a plurality of switchable input channels each having an output terminal, all of said output terminals being connected together to serve as the multiplexer output, means for providing a first constant current having a first current polarity to said output terminals, said first constant-current being regulated by amplification in response to deviations of the first current from a predetermined value, and selection means providing control signals to said switchable input channels for selecting one channel and blocking the other channels, wherein each of said switchable input channels further comprises a signal terminal having a signal voltage responsive to one of said available signals, a first rectifying means connected to said signal terminal and having a second electrode for, upon selection of that channel, transferring from the signal terminal to the second electrode the signal voltage diminished by a current-dependent voltage drop in the first rectifying means, a second rectifying means opposably connected to the second electrode of the first rectifying means for, upon selection of that channel, transferring from said second electrode to said output terminal the signal voltage diminished by the voltage drop in the first rectifying means and augmented by a current-dependent voltage drop in the second rectifying means, and means for providing a total constant current having a current polarity opposite said first current polarity, said total constant current being regulated by amplification in response to deviations of the total current from a second predetermined value and being switchably responsive to said control signals for, upon selection of the channel, drawing the total constant current from said first and second rectifying means collectively to enable transfers of signals through said first and second rectifying means, said total current being such that the magnitude of said voltage drop in the first rectifying means equals the magnitude of said voltage drop in the second rectifying means, whereby a voltage at the multiplexer output tracks the selected signal voltage.

2. A multiplexer as defined in claim 1 wherein said first and second rectifying means have substantially matched current-dependent voltage drops and wherein said total current is twice said first current.

3. A multiplexer as defined in claim 1 wherein each of said switchable input channels further comprises signal source means for continuously providing a signal current to said signal terminal and wherein each of said switchable input channels further comprises a substitute switchable source of constant current switchably responsive to said control signals for drawing said signal current from said signal terminal only when the channel is not selected, whereby said signal current in a channel is substantially the same when the channel is selected as when it is not selected.

4. A multiplexer as defined in claim 3 wherein said substitute switchable source comprises a static selector switch connected to said signal terminal and responsive to said control signals, a constant-current generator connected to said static selector switch, and an idling current circuit connected to said static selector switch, and wherein said static selector switch selects said idling current circuit for providing current to said constant-current generator when the corresponding input channel is selected and selects the signal terminal for providing current to the constant-current generator when the corresponding input channel is not selected.

5. A multiplexer as defined in claim 1 wherein each of said switchable input channels further comprises signal source means having an input terminal receiving one of said available signals for providing to said signal terminal a signal voltage responsive to said one of said available signals, said signal source means having offsetting means for offsetting said signal voltage by a voltage component whose amount is predetermined and unresponsive to said available signals.

6. A multiplexer as defined in claim 1 wherein said means for providing a total constant current comprises a static selector switch connected to said second electrode and responsive to said control signals, a constant-current generator connected to said static selector switch, and an idling current circuit connected to said static selector switch, and wherein said static selector switch selects the first and second rectifying means at said second electrode for collectively providing current to said constant-current generator when the corresponding input channel is selected and selects said idling current circuit for providing current to said constant-current generator when the corresponding input channel is not selected.

7. A multiplexer for selectively connecting one of a plurality of available signals to a common output bus in accordance with selection signals, comprising a plurality of sources of input signals, a first plurality of rectifying means each having a signal terminal and a second terminal and each having its signal terminal connected to a different one of said sources of input signals for conducting current therefrom to said second terminal, a second plurality of rectifying means each having a first terminal and a second terminal and each having its second terminal connected in a junction to the second terminal of one of said first plurality of rectifying means for conducting current to each of said junctions, a common output bus to which the first terminal of each of said second plurality of rectifying means is connected, a current source connected to said output bus for supplying regulated current to said output bus, and a plurality of regulated current sinks, each being connected to a different one of said junctions and each being switchable to conduction and non-conduction from said junctions in accordance with said selection signals for selectively drawing from one at a time of said junctions a regulated current substantially twice as great as the regulated current supplied by said current source.

8. A multiplexer as defined in claim 7 wherein each of said plurality of sources of input signals comprises a voltage source for establishing a voltage signal at said signal terminal of a corresponding one of said first plurality of rectifying means, and a compensating current sink with gain connected to said signal terminal, said compensating current sink being switchable to conduction and non-conduction from said signal terminal in accordance with a logical inverse of said selection signal for drawing from said signal terminal a current substantially equal to the regulated current supplied by said current source when the corresponding one of said plurality of current sinks is not conducting.

9. A multiplexer as defined in claim 8 wherein the compensating current sink comprises a constant-current generator with gain, and wherein said current drawn from the signal terminal by the conpensating current sink is current-regulated and constant.

* * * * *